United States Patent Office 3,058,047
Patented Oct. 9, 1962

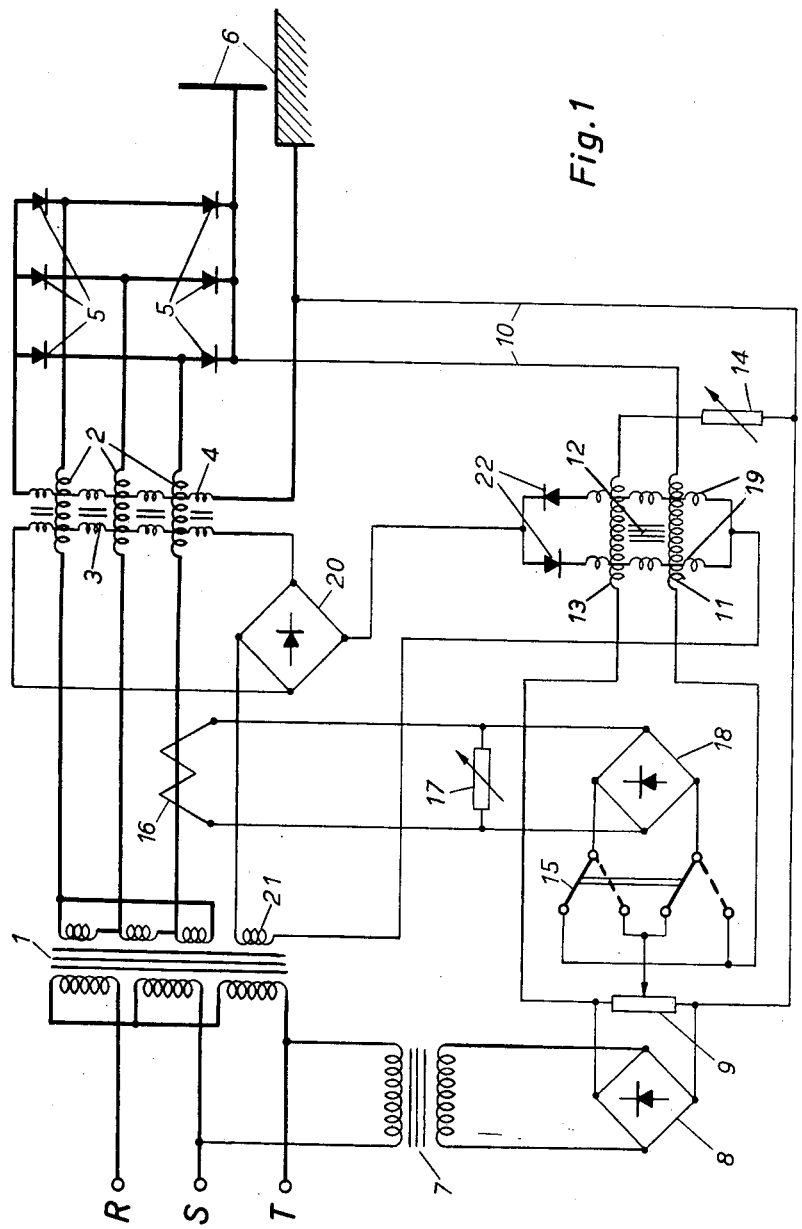

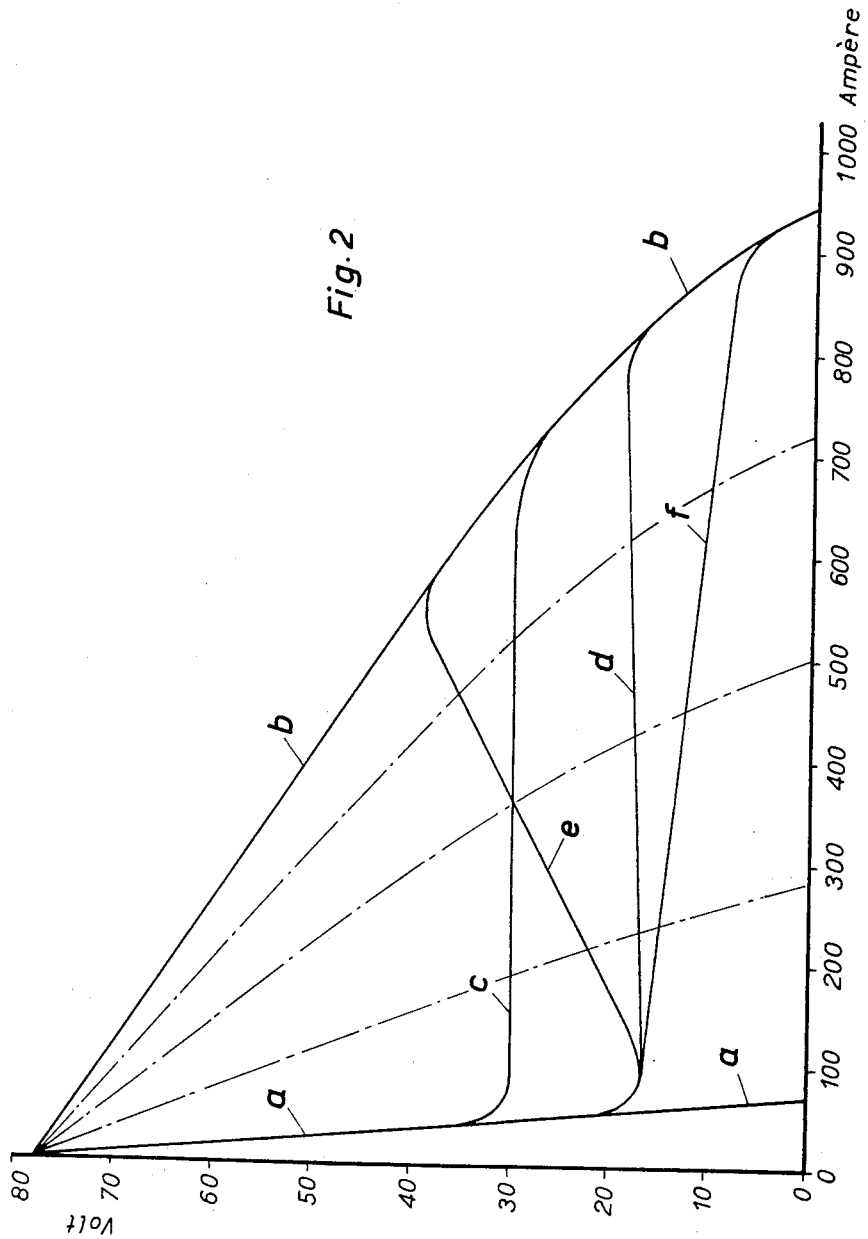

3,058,047
CURRENT SUPPLY SYSTEM FOR ARC WELDING
Franz Tajbl, Pullach, near Munich, Germany, assignor to Gesellschaft für Linde's Eismaschinen Aktiengesellschaft, Hollriegelskruth, near Munich, Germany
Filed Dec. 3, 1957, Ser. No. 700,365
Claims priority, application Germany Dec. 4, 1956
9 Claims. (Cl. 321—18)

This invention relates to a regulating unit for supplying a welding load with a stabilized output.

Regulating units are known whose output corresponding to a measured value to be held constant, for instance the voltage of a welding arc, is fed back to a regulating amplifier. Together with said measured value, a reference value corresponding to a desired value for said output, is fed to the regulating amplifier which thus amplifies the difference between the measured value and desired value. The output of the regulating amplifier influences a controller connected in series or parallel with a welding current source so that, within a certain range, for instance, the load range of the welding current, a stabilized output is obtained. However, these known arrangements suffer from the disadvantage that the output, for instance, the voltage in the case where the arc-voltage is to be held constant, is stabilized over the whole load range (especially if the arc has not struck and the current is zero) at a relatively low value corresponding to that required to maintain the welding arc so that the output voltage of the unit is insufficient to ensure proper striking of the arc if no current is flowing.

An object of the present invention is to devise an improved form of regulating or stabilizing unit which avoids the foregoing disadvantage.

According to the invention there is provided a regulating unit for supplying a welding load with a stabilized output comprising a controller, an amplifier with continuous input-output characteristic, the input of said amplifier being influenced by the difference of a measured value derived from the output of said controller and of a constant desired value; an inverse feed back connecting the output of said amplifier to means for influencing the output of said controller, and means for biassing the working point of said amplifier to cut-off, whereby it does not produce an output until the input overcomes the bias so that stabilizing of the welding output takes place only after the measured value has dropped at least to the desired value.

For a better understanding of the invention, and to show how the same may be carried into effect, reference will now be made to the accompanying drawings, which show, by way of example only, one embodiment of the invention.

FIG. 1 is a wiring diagram of the current source. In FIG. 2 are given the various relationships which can be obtained between the welding voltage and the welding current (characteristics).

In FIG. 1 the circuit through which the welding current flows is drawn with thick lines, while the remaining controlling circuits are drawn with thin lines. The three-phase transformer, represented as a welding transformer 1, is fed from a three-phase mains, RST. The controller having control chokes 2 through which the welding alternating current flows, is influenced by premagnetizing coils 3 and 4 to which a welding rectifier 5 joins itself in a three-phase connection. With the aid of a direct current saturating winding 3, the resistance of the chokes 2 can be varied. Welding current flows through the saturating winding 4 and serves in an inherent manner to support the effect of winding 3. The welding electrode and workpiece are indicated symbolically by reference numeral 6. An alternating current voltage is supplied by the three phase lines through transformer 7, rectified by a full wave rectifier 8, and then led to the potentiometer 9. The difference between the constant reference voltage at the tapped potentiometer 9 and the welding voltage applied to the circuit 10 will be formed and applied to the input in form of a control winding 11 of an amplifier which, in the illustrated embodiment, is of the magnetic type. A bias magnetization winding 13 of amplifier 12 serves to adjust the working point of amplifier 12 with the help of an adjustable resistor 14. By working point is meant the point at which the amplifier begins to produce an output with a changing input. To the adjustable constant reference voltage can be added a voltage proportional to the welding current by means of a two pole double throw switch 15 which is reversible in direction. The latter voltage is taken from the A.C. welding current by means of a current transformer 16, rectified at rectifier 18 and applied to switch 15, and its magnitude can be adjusted with an aid of the adjustable resistor 17 connected in parallel with transformer 16. Amplifier 12 serves to produce a direct current in winding 3 of the control chokes 2 of the regulator proportional to the amplifier output and the direct current flow in winding 3 provides the regulation for the second section of the characteristic of the current source previously referred to. This direct current is obtained from a rectifier 20, and alternating current supplied to the latter by auxiliary winding 21 on the welding transformer 1. The alternating current flows in the form of two pulsating direct currents (rectifiers 22) in alternation through both paralleled load coils 19 of the amplifier 12 which are in series with the input to rectifier 20.

In order to illustrate the manner in which the arrangement in FIG. 1 operates, the graph of FIG. 2 is used. Assuming that the winding 3 influencing the control chokes 2 receives no current, the voltage at the output side of the chokes 2 would follow along curve $a$ as the load current increases. If the chokes 2 are saturated by current through winding 3, the output voltage would follow along curve $b$ for the various load current values indicated. For different but constant degrees of energization of winding 3, the voltage output characteristic would follow along the curves shown in the dash-dot lines.

The working range of the chokes 2 lies in the field bounded by curves $a$ and $b$. If a constant reference value such as, for example, 30 volts is established at potentiometer 9, and the difference between this reference voltage and the measured value (voltage) derived from the output of chokes 2 which exists between leads 10 is obtained and applied to the input (control winding 11) of amplifier 12, the voltage output curve $c$ will be obtained. So long as the difference between the reference and measured values, i.e. voltages, remains above a predetermined minimum, no output will be produced from amplifier 12. Consequently, the saturating winding 3 is not energized. If an electric arc is now drawn at 6, the welding voltage, i.e. the output voltage from chokes 2 will fall off from the open circuit voltage value of 77 volts along curve $a$ until the reference voltage 30V (at the characteristic $c$) is reached. At that moment the difference between the reference voltage and the welding voltage becomes zero. The amplifier 12 opens i.e. it begins to produce an output and currents now begin to flow in its load coils 19 which, in the working range of the chokes 2, that is, between characteristics $a$ and $b$, will serve to maintain the welding voltage at a value always equal to the constant reference voltage namely 30V. If the welding current along the characteristic $c$ increases to the point where the characteristics $c$ and $b$ meet, the end of the working range of the chokes 2 will be attained. The welding voltage then falls off along characteristic $b$ with increasing welding current until there is finally a flow of short circuit current. With a constant reference voltage, therefore the characteristics of the three sections combine. In the second section, where the working range corresponds to the chokes 2, the welding voltage is equal to the reference voltage (characteristic c). Since the constant reference voltage is adjustable at the potentiometer 9, the height of the horizontal characteristic c also can be adjusted inside of the field limits of the characteristics a and b.

If a voltage proportionally equal to the welding current is now added to the constant reference voltage measured at the potentiometer 9, falling and rising characteristics can be obtained which are characterized by three characteristics d, e, and f. If the voltage coming from the current transformer 16, and supplied by the rectifier 18, is adjusted in magnitude by means of the adjustable resistor 17, and then is added to the difference between the constant reference voltage and the welding voltage (with the aid of switch 15), the combined voltage will, therefore, increase with increasing welding current intensity. The welding voltage (measured value) in the working range of the chokes 2 also increases with increasing welding current strength. If, therefore, the welding voltage in the operating voltage of the chokes 2 increases with an increase in welding current strength, it means that rising characteristics will be obtained which, according to the position of the adjustable resistor 17, more or less increase (characteristics d and e). If, however, the proportionally equal value be subtracted from the welding current strength—and this can be accomplished by switch 15—a falling characteristic in the form f will be obtained. These characteristics consist also of three sections. As the welding current increases, the welding voltage will fall off along curve a until its junction point with the second sections, curves d, e or f is reached. The beginning of the section is effected as soon as the amplifier 12 begins to produce an output which is applied to winding 3 on chokes 2. The measured value, i.e. the welding voltage will then follow either curve d, e or f until the junction with curve b is reached at which time the core of chokes 2 reaches saturation and the welding voltage then follows curve b as the welding current further increases.

If for transformer 7, a special constant potential transformer is used, the plotted constant relative voltage on the potentiometer 9 becomes independent of fluctuations in the power supply voltage. The welding voltage follows, passed on by amplifier 12, and is necessary for the constant reference voltage. If, then, the reference voltage is fixed, so also is the welding voltage.

The essential idea of the invention lies in the arrangement by which the measured value, i.e. output voltage, is permitted to drop rapidly with an increase in welding current until a reference voltage value is reached at which time the amplifier 12 opens to produce an output which is used as an input to chokes 2, which then stabilizes the measured value at a magnitude equal to the reference value which may be constant or variable, as the welding current is further increased. In the description of the present embodiment, the amplifier is illustrated as a magnetic amplifier. The invention may make it possible to apply instead of a magnetic amplifier, an electronic tube amplifier or a machine type of amplifier (Amplidyne). The main idea of the invention applies also, of course, to the production of homogeneous characteristics with alternating welding current sources, i.e., transformers or rotating transformer may be applied to direct current transformers.

I claim:

1. A current source arrangement for supplying an arc welding load comprising a source of alternating voltage, rectifier means supplied by said alternating voltage source, the output of said rectifier means being connectable to said load, a magnetic modulator connected in circuit between said alternating voltage source and said rectifier means, said modulator including a direct current saturating winding thereon, and an amplifying device for controlling the current flow through said saturating winding, the output from said amplifying device and which is supplied to said saturating winding being controlled in accordance with the input to said amplifying device, and said input being constituted by the difference between a reference voltage and the voltage across the output of said rectifier means, said reference voltage being comprised of a first constant voltage component combined with a second voltage component proportional to the current output from said rectifier means, and means establishing a working point for said amplifying device such as to delay any output therefrom until the difference between said reference voltage and rectifier output voltage reaches a predetermined minimum.

2. A current source arrangement as defined in claim 1 wherein said second voltage component proportional to the rectifier current output is added to said first constant voltage component to develop a rising rectifier output voltage characteristic with increasing rectifier output current up to saturation of said magnetic modulator.

3. A current source arrangement as defined in claim 1 wherein said second voltage component proportional to the rectifier current output is subtracted from said first constant voltage component to develop a falling rectifier output voltage characteristic with increasing rectifier output current up to saturation of said magnetic modulator.

4. A current source arrangement as defined in claim 1 and which includes switching means selectably operable to add or subtract said second voltage component proportional to the rectifier output current to or from said first constant voltage component, respectively.

5. A current source arrangement as defined in claim 1 wherein said regulating device comprises a magnetic amplifier having one control magnetizing winding thereon supplied with a direct current determined by said difference between said control voltage and the voltage across the output of said rectifier means, and a second control magnetizing winding energized by a constant but adjustable direct current.

6. A current source arrangement for supplying an arc welding load comprising a voltage source connectable to said load by means of a circuit extending therebetween, a controller in said circuit for regulating the voltage at said load, an amplifier, means connecting the output from said amplifier to said controller for controlling the voltage regulating function thereof, means providing a reference voltage, means producing an input voltage to said amplifier for controlling the output thereof, said input voltage corresponding to the difference between said reference voltage and the voltage at said load, and means establishing a working point for said amplifier such as to delay any output therefrom until said input voltage reaches a predetermined minimum.

7. A current source arrangement for supplying an arc welding load comprising a value source connectable to said load by means of a circuit extending therebetween, a controller in said circuit for regulating the value at said load, an amplifier, means connecting the output from said amplifier to said controller for controlling the value regulating function thereof, means providing a reference value, means producing an input value to said amplifier for controlling the output thereof, said input value corresponding to the difference between said reference value and the value at said load, and means establishing a working point for said amplifier such as to delay any output therefrom until said input value reaches a predetermined minimum.

8. A current source arrangement as defined in claim 7 wherein said reference value is comprised of a first constant value component combined with a second value component proportional to a second parameter of the output of said controller.

9. A current source arrangement as defined in claim 8 wherein said value to be regulated is voltage and said second parameter is the current from said source.

References Cited in the file of this patent

UNITED STATES PATENTS

| | | |
|---|---|---|
| 1,051,238 | Lamboeuf | Jan. 21, 1913 |
| 2,188,436 | Hugus | Jan. 30, 1940 |
| 2,673,324 | Burton et al. | Mar. 23, 1954 |
| 2,709,779 | Bixby | May 31, 1955 |
| 2,800,571 | Glenn et al. | July 23, 1957 |
| 2,880,374 | Mulder | Mar. 31, 1959 |
| 2,891,210 | Mulder | June 16, 1959 |

FOREIGN PATENTS

| | | |
|---|---|---|
| 608,423 | Great Britain | Sept. 15, 1948 |